(12) United States Patent
Zhou et al.

(10) Patent No.: US 11,797,375 B2
(45) Date of Patent: Oct. 24, 2023

(54) SYSTEM FOR DEBUGGING SERVER STARTUP SEQUENCE IN DEBUGGING METHOD APPLIED IN SERVER

(71) Applicant: Fulian Precision Electronics (Tianjin) Co., LTD., Tianjin (CN)

(72) Inventors: Xiao-Long Zhou, Tianjin (CN); Ming-Hua Yu, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 2 days.

(21) Appl. No.: 17/729,145

(22) Filed: Apr. 26, 2022

(65) Prior Publication Data

US 2023/0168963 A1 Jun. 1, 2023

(30) Foreign Application Priority Data

Dec. 1, 2021 (CN) .......................... 202111452533.X

(51) Int. Cl.
  *G06F 11/00* (2006.01)
  *G06F 11/07* (2006.01)
  *G06F 9/50* (2006.01)
  *G06F 11/25* (2006.01)
  *G06F 11/22* (2006.01)

(52) U.S. Cl.
  CPC .......... *G06F 11/0793* (2013.01); *G06F 9/505* (2013.01); *G06F 11/2247* (2013.01); *G06F 11/25* (2013.01)

(58) Field of Classification Search
  CPC .. G06F 9/505; G06F 11/0793; G06F 11/2247; G06F 11/25
  See application file for complete search history.

(56) References Cited

U.S. PATENT DOCUMENTS

| | | | | |
|---|---|---|---|---|
| 8,081,079 B1* | 12/2011 | Camarota | ........ | G06K 19/07758 340/572.1 |
| 2011/0289268 A1* | 11/2011 | Patel | ...................... | G06F 3/0683 711/E12.078 |
| 2012/0144256 A1* | 6/2012 | Bailey | ................... | G06F 11/273 714/E11.155 |
| 2014/0119074 A1* | 5/2014 | Courtney | ................ | H02M 7/23 363/70 |
| 2016/0335095 A1* | 11/2016 | Wu | ........................... | G06F 1/26 |
| 2019/0045358 A1* | 2/2019 | Ahmed | ................. | H04W 12/04 |
| 2020/0132768 A1* | 4/2020 | Sang | ............. | G01R 31/318597 |
| 2020/0132769 A1* | 4/2020 | Sang | ............. | G01R 31/318597 |
| 2021/0041903 A1* | 2/2021 | Wang | ....................... | G05F 1/66 |
| 2021/0081286 A1* | 3/2021 | Lambert | .............. | G11C 7/1063 |
| 2022/0350386 A1* | 11/2022 | Cheng | ...................... | G06F 1/30 |

* cited by examiner

*Primary Examiner* — Joshua P Lottich
(74) *Attorney, Agent, or Firm* — ScienBiziP, P.C.

(57) ABSTRACT

A system for debugging server startups incorporated in a method applied in a server includes voltage regulators, a complex programmable logic device (CPLD), a transmitting device, and a display device. The voltage regulators transmit power-on signals required when the server is started. The CPLD receives the power-on signals, collects a second signal from the power on signals, and converts the second signals into a second data. The transmitting device receives the second data and parses the second data into a third data. The displaying device receives the third data and displays power-on signals that do not meet required standard during startup of server, according to the third data.

17 Claims, 4 Drawing Sheets

SYSTEM FOR DEBUGGING SERVER STARTUP SEQUENCE IN DEBUGGING METHOD APPLIED IN SERVER

FIELD

The subject matter herein generally relates to systems for debugging.

BACKGROUND

During product development stage and even after production, when debugging a faulty server machine, it is necessary to debug the power on and the power off sequences. There are usually two traditional debugging methods, the first method is to weld a power control and indicator signal on the circuit board of the server, measure the signal with a logic analyzer or oscilloscope, and analyze sequence and time. The welding is time-consuming and laborious, may cause some damage to the circuit board of the server. The second method is to display the status of the startup sequence on the debugging LED when controlling the startup sequence, the display being in the form of binary code. However, since the LED is observed with the naked eye, the sequence and time between power rails is difficult to accurately judge. Debugging the server startup sequence needs improvement.

Therefore, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
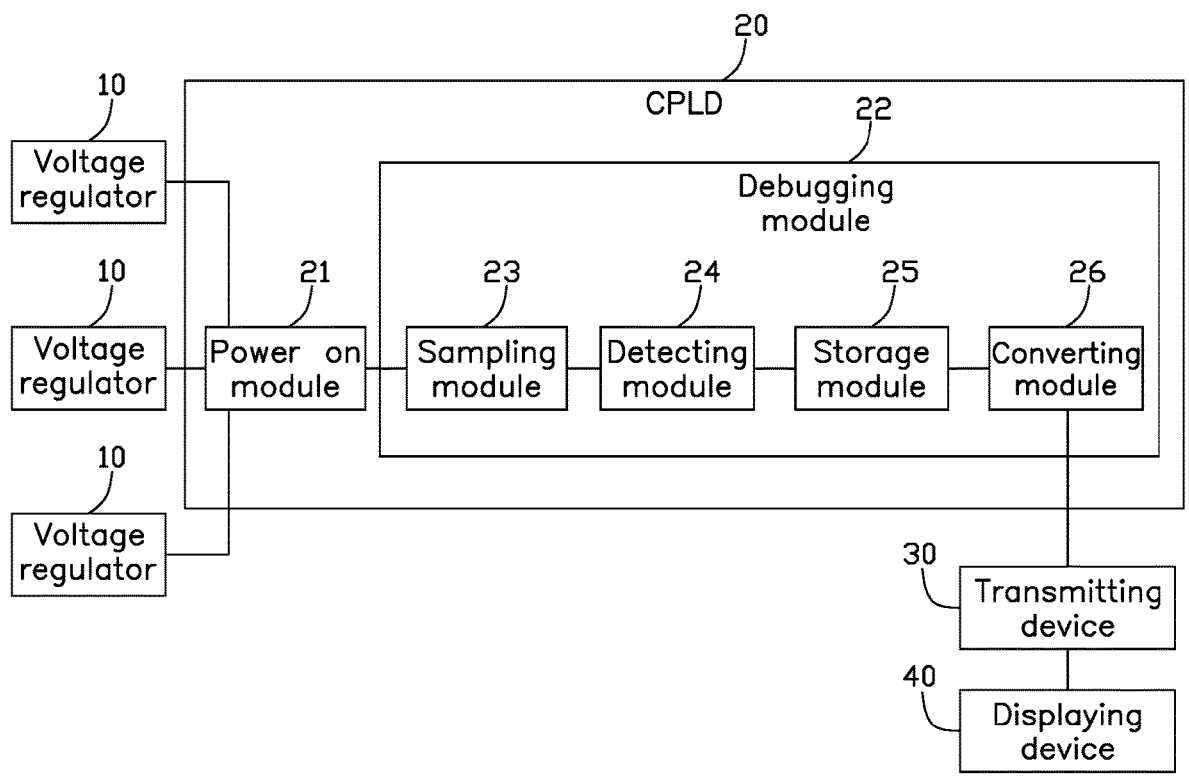
FIG. 1 is a block diagram of an embodiment of a system for debugging server startup sequence according to the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

The system of the present disclosure can debug the startup sequence of the server without welding test lines on the circuit board of the server and without external instruments. The debugging module in the complex programmable logic device (CPLD) is used to sample and detect the signals in the power on sequence (POsequence) and determine whether the power on meets standards, and the display device displays signals that indicate non-compliance.

FIG. 1 illustrates a server startup sequence debugging system 100 in accordance with an embodiment of the present disclosure. The server startup sequence debugging system 100 can be applied to a server 200 (shown in FIG. 2).

The server startup sequence debugging system 100 includes a plurality of voltage regulators 10, a complex programmable logic device (CPLD) 20, a transmitting module transmitting device 30, and a displaying device 40.

The voltage regulators 10 are electrically connected to the CPLD 20, the CPLD 20 is electrically connected to the transmitting device 30, and the transmitting device 30 is electrically connected to the displaying device 40.

Figure 2:
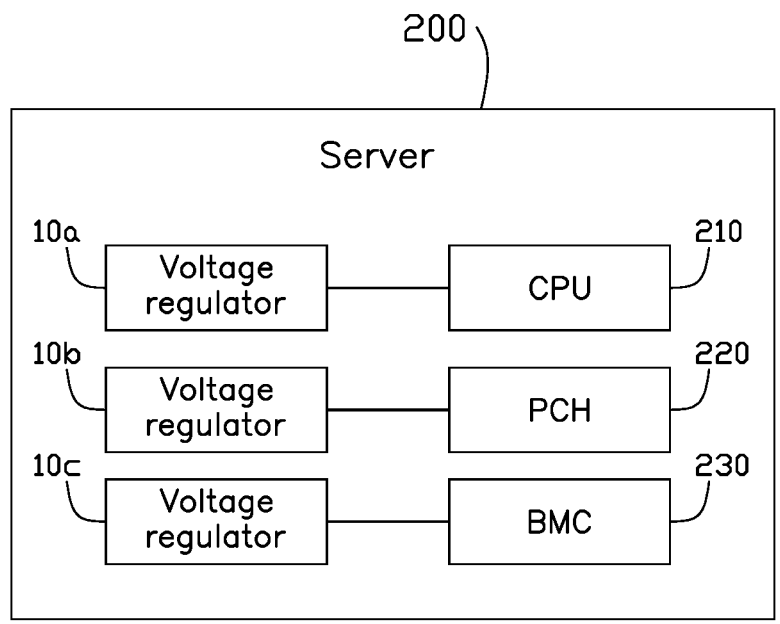
FIG. 2 is a block diagram of an embodiment of a server according to the present disclosure.

The voltage regulator 10 is used to adjust and transmit the power-on signal required by each component of the server 200 when the server 200 is powered on, to power up the server 200. The voltage regulator 10 transmits the power-on signal to the CPLD 20. In one embodiment, the power-on signal transmitted by the voltage regulator 10 to the server 200 and the CPLD 20 can be an electrical signal. The signals transmitted by the voltage regulators 10 to each component of the server 200 are power-signals, so power is applied to each component of the server 200. A voltage regulator 10 outputs a power-on signal, and the CPLD 20 receives plurality of power-on signals. As shown in FIG. 2, the server 200 may include a plurality of components, for example, the server 200 may include a central processing unit (CPU) 210, a platform controller hub (PCH) 220, and a baseboard management controller (BMC) 230. The voltage regulator 10a is electrically connected to the CPU 210, the voltage regulator 10b is electrically connected to the PCH 220, and the voltage regulator 10c is electrically connected to the BMC 230. The voltage regulator 10a outputs the power signal to the CPU 210, to supply power to CPU 210, the voltage regulator 10b outputs the power signal to the PCH 220, to supply power to the PCH 220, the voltage regulator 10c outputs the power signal to the BMC 230, to supply power to the BMC 230.

The CPLD 20 includes a power on module 21 (PO module 21) and a debugging module 22. The power on module 21 can write a logic program, and then the power on module 21 is used to receive the power-on signal transmitted by the voltage regulator 10 according to the written logic program, distribute it to each component of the server 200, and transmit the power-on signal to the debugging module 22. The debugging module 22 is electrically connected to the power on module 21. The debugging module 22 includes a sampling module 23, a detecting module 24, a storage module 25, and a converting module 26.

The sampling module 23 is electrically connected to the power on module 21, and the sampling module 23 is used to collect an initial voltage when the server 200 is powered on and any change of the power-on signal in the timing in the subsequent power-on process. When the power on module 21 transmits the power-on signal to the sampling module 23, the sampling module 23 encodes the power-on signal in the power-on sequence and collects the initial voltage of the power on signal at power on. The sampling module 23 may include a sampling timer. When the server 200 is started, the sampling timer starts to time, and the sampling timer continues to keep counting time in the subsequent power on process. In some embodiments, when the server 200 is started, the power on flag will be effective, and the sampling timer starts timing at that point.

The detecting module 24 is electrically connected to the sampling module 23, and the detecting module 24 is used to detect a change of the power-on signal in the power-on sequence. It can be understood that all signals in the power-on sequence are first signals, and the second signal is the power-on signal that represents a change in the power-on sequence. When a second signal is detected in the power-on signal in the power-on sequence, and the time when the second signal changes, and the coding of the second signal, are extracted from the sampling module 23. This integrates the encoding and time of change into the first data in the preset byte stream format and transmit the first data to the storage module 25. In some embodiments, the detecting module 24 is also used to detect whether the power-on process of the server 200 is abnormal. In one embodiment, the detecting module 24 can be a detector, and the storage module 25 can be a storage device.

The storage module 25 is electrically connected to the detecting module 24. The storage module 25 can be a random-access memory (RANI) to store the time when the second signal changes during the server startup detected in the detecting module 24 and the coding of the second signal. In some embodiments, the storage module 25 may be used to store data in the preset byte stream format.

When the storage module 25 is full, the converting module 26 extracts and converts the first data in the storage module 25. Until the storage module 25 is full, the detecting module 24 detects whether the startup of the server 200 is an abnormal one (such as an abort of the power-on).

If no abnormality in the power-on process of the server 200 is detected, the converting module 26 extracts the first data in the storage module 25 and converts the first data.

If no abnormality is detected, the detecting module 24 check whether the power on of the server 200 is completed.

If it is detected that startup of the server 200 is completed, the converting module 26 extracts and converts the first data in the storage module 25.

Before completion of the startup of the server 200, the detecting module 24 continues to detect any change of the power-on signal, and the storage module 25 also continues to store time-counts of when the second signal changes during the startup of the server 200.

The converting module 26 is electrically connected to the storage module 25, and the converting module 26 is used to convert the first data in the storage module 25 into the second data. The second data can be ASCII code, and the converted second data can be transmitted to the displaying device 40 through the transmitting device 30. In some embodiments, the transmitting device 30 may receive, parse, and transmit the ASCII codes.

Figure 3:
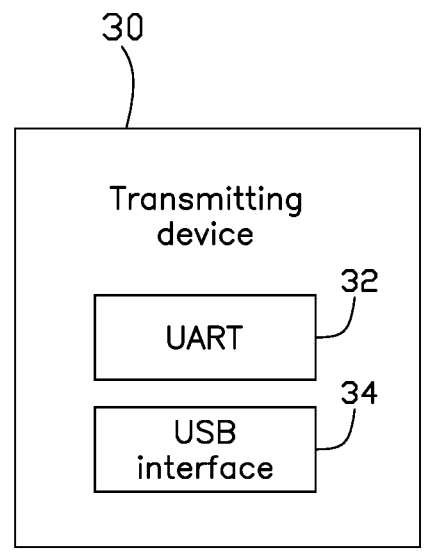
FIG. 3 is a block diagram of an embodiment of a transmitting device according to the present disclosure.

In some embodiments, as shown in FIG. 3, the transmitting device 30 includes a universal asynchronous receiver/transmitter (UART) 32 and a universal serial bus (USB) interface 34. The UART 32 can receive the second data and process the second data into a third data, the third data can be USB data. The UART 32 can transmit the third data through the USB interface 34. In some embodiments, the transmitting device 30 can be connected with the displaying device 40 through a USB data cable to transmit the third data to the displaying device 40.

The displaying device 40 is electrically connected to the transmitting device 30. The displaying device 40 can display the timing of signals in the whole power-on process. For example, the displaying device 40 displays the power-on signal that the power-on sequence meets the standards during startup of the server 200, the displaying device 40 further displays the power-on signal that the power-on sequence does not meet the standards during the power on process of the server 200.

In some embodiments, a program can be written in the displaying device 40. The displaying device 40 is used to obtain changes of the power on signal in the power-on sequence according to the third data, and the displaying device 40 determines whether the power-on sequence meets the standard. When it is determined that all signals comply with the standard, each component of the server 200 is normally powered on within the time sequence specified in the standard during startup of the server 200, and the debugging is completed. When it is determined that a signal does not comply with the standard, this indicates that one or more components of the server does not start normally within the time sequence specified in the standard, and the one or more signals that does not comply with the standard is displayed on the displaying device 40.

Figure 4:
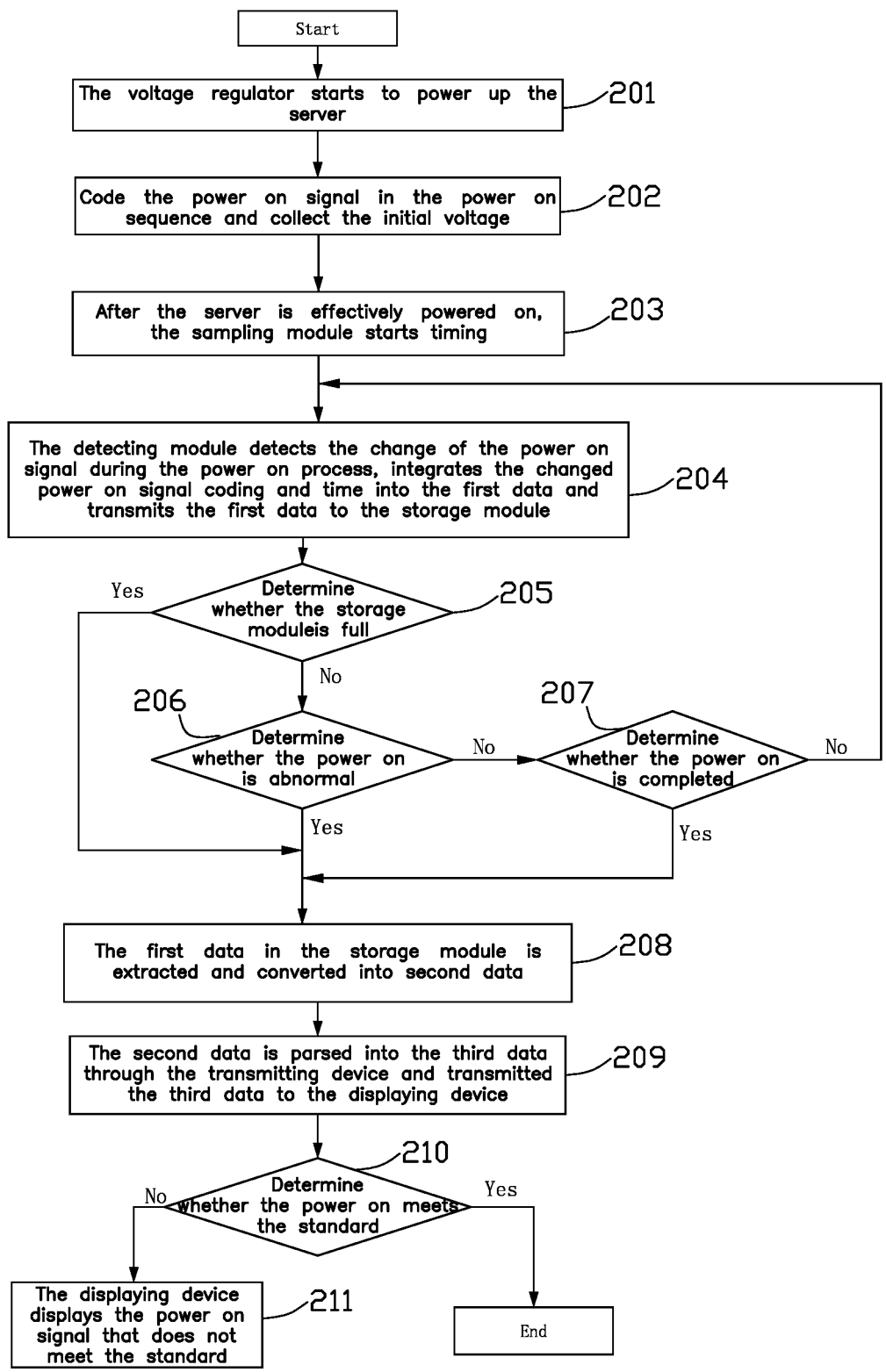
FIG. 4 is flowchart of an embodiment of a system for debugging server startup sequence according to the present disclosure.

FIG. 4 is flowchart depicting an embodiment of a method applying the system to a server. The method is provided by way of example, as there are a variety of ways to carry out the method. The method described below can be carried out using the configurations illustrated in FIG. 1 for example, and various elements of these figures are referenced in explaining the example method. Each block shown in FIG. 1 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 201.

At block 201, the voltage regulator 10 starts to power up the server 200.

When the server 200 is powered on, the voltage regulator 10 transmits the power-on signal to the power on module 21, and a logic program is written in the power on module 21. The power on module 21 can be used to receive the power on signal transmitted by the voltage regulator 10 according to the logic program, distribute it to various components of the server, and transmit the power-on signal to the sampling module 23 at the same time, then executes block 202.

At block 202, code the power-on signal in the power on sequence and collect an initial voltage.

When the power on module 21 transmits the power-on signal to the sampling module 23, the sampling module 23 encodes the power-on signal in the power-on sequence, collects the initial voltage at power-on, and then executes block 203.

At block 203, after the server is effectively powered on, the sampling module starts timing.

The sampling module 23 may include a sampling timer. When the server 200 starts effective power on, the sampling timer starts timing. In the subsequent power on process, the sampling timer keeps timing continuously, and then executes block 204.

At block 204, the detecting module 24 detects the change of the power on signal during the power on process, integrates the changed power on signal coding and time into the first data and transmits the first data to the storage module 25.

The detecting module 24 detects the change of any power on signal in the power on sequence. When it is detected that there is a second signal in the power on signal in the power-on sequence, the second signal is the power on signal that changes in the power on sequence, the time when the second signal changes and the coding of the second signal are extracted from the sampling module 23, to integrate the encoding and change time of the second signal into the first data in the preset byte stream format, and transmit the first data to the storage module 25, and then executes block 205.

At block 205, determine whether the storage module 25 is full.

When the storage module 25 is full, the first data in the storage module 25 is extracted, and the first data is transmitted to the converting module 26, and then block 208 is executed. When the storage module 25 is not full, detect whether the power on process of the server 200 is abnormal (such as power on abort), and then executes block 206.

At block 206, determine whether the power on is abnormal.

If it is detected that there is abnormal in the power-on process of the server 200, the first data in the storage module 25 is extracted and transmitted to the converting module 26, and block 208 is executed. If it is detected that the power on process of the server 200 is no abnormality, check whether the power on of the server is completed, and block 207 is executed.

At block 207, determine whether the power-on is completed.

If it is detected that the server 200 is powered on, the first data in the storage module 25 is extracted and transmitted to the converting module 26, and then block 208 is executed. If it is detected that the power-on of the server 200 has not been completed, and block 204 is executed.

At block 208, the first data in the storage module 25 is extracted and converted into second data.

The converting module 26 is electrically connected to the storage module 25. The converting module 26 is used to convert the data in the storage module 25 into the second data, and then the second data can be parsed into the third data through the transmitting device 30, and the transmitting device 30 transmits the third data to the displaying device 40, and then execute block 209.

At block 209, the second data is parsed into the third data through the transmitting device 30 and transmitted the third data to the displaying device 40.

The transmitting device 30 includes an UART 32 and an USB interface 34. The UART 32 can receive the second data and analyze the second data into a third data, the third data can be USB data. The UART 32 can transmit the third data through the USB interface 34. In some embodiments, the transmitting device 30 can be connected with the displaying device 40 through an USB data cable to transmit the third data to the displaying device 40, and then execute block 210.

At block 210, determine whether the power on meets the standard.

In some embodiments, a program can be written in the displaying device 40. The displaying device 40 is used to obtain the change of the power on signal in the power on sequence according to the third data, and the displaying device 40 determines whether the power on meets the standard. When it is determined that the change of the power-on signal complies with the standard, each component of the server 200 is normally powered on within the time sequence specified in the standard during the power on of the server 200, the debugging is completed. When it is determined that the change of the power on signal does not comply with the standard, each component of the server does not normally power-on within the time sequence specified in the standard during the power on of the server, the power on signal that does not comply with the standard is displayed on the displaying device 40, then block 211 is executed.

At block 211, the displaying device 40 displays the power on signal that does not meet the standard.

When it is determined that the change of the power on signal does not comply with the standard, each component of the server does not normally power on within the time sequence specified in the standard during the power on of the server, the power on signal that does not comply with the standard is displayed on the displaying device 40.

The server startup sequence debugging system 100 of the present disclosure can debug the startup sequence of the server without welding test lines on the circuit board of the server and external instruments. The debugging module in the CPLD is used to sample and detect the signals in the power on sequence and determine whether the power on meets the standard, and the displaying device 40 displays the signals that does not comply with the power on standard.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A server startup sequence debugging system applied to a server and comprising:
   a plurality of voltage regulators configured to adjust and transmit power-on signals required when the server is started; and
   a complex programmable logic device (CPLD) configured to receive the power-on signals, collect a second signal of the power-on signals, and convert the second signal into a second data;
   a transmitting device configured to receive the second data and parse the second data into a third data; and
   a displaying device configured to configured to receive third data and display the power-on signals that power-on sequence does not meet standard during a power-on of the server according to the third data.

2. The server startup sequence debugging system of claim 1, wherein the CPLD comprises a power-on module and a debugging module, the power-on module is configured to receive the power-on signals transmitted by the voltage regulators, and distribute the power-on signals to the server, and transmit the power-on signals to the debugging module; the debugging module is electrically connected to the power-on module, and the debugging module comprises a sampling module, a detecting module, a storage module and a converting module.

3. The server startup sequence debugging system of claim 2, wherein the sampling module is electrically connected to the power-on module, and the sampling module is configured to collect an initial voltage when the server is powered on and change of signal in the power-on sequence during power-on; when the power-on module transmits the power-on signals to the sampling module, the sampling module encodes the power-on signals in the power-on sequence and collects the initial voltage of the power-on signals when power-on; when the server starts effective power-on, the sampling module starts timing, in the power-on of the server, the sampling module continues to keep timing.

4. The server startup sequence debugging system of claim 3, wherein the detecting module is electrically connected to the sampling module, and the detecting module is configured to detect change of the signal in the power-on sequence; when the detecting module detects there is a second signal in the power-on signals in the power-on sequence, the second signal is a power-on signal that changes in the power-on sequence, a time when the second signal changes and encoding of the second signal are extracted from the sampling module, to integrate the time when the second signal changes and the encoding of the second signal into a first data in a preset byte stream format, and transmit the first data to the storage module; and the detecting module is configured to detect whether the power-on of the server is abnormal.

5. The server startup sequence debugging system of claim 4, wherein the storage module is electrically connected to the detecting module, and the storage module is configured to store the time when the second signal changes and the encoding of the second signal.

6. The server startup sequence debugging system of claim 5, wherein when the storage module is full, the converting module extracts the first data in the storage module and converts the first data.

7. The server startup sequence debugging system of claim 6, wherein the converting module is electrically connected to the storage module, the converting module is configured to convert the first data into the second data, and the second data is transmitted to the displaying device through the transmitting device.

8. The server startup sequence debugging system of claim 5, wherein when the storage module is not full, the detecting module detects whether the power-on of the server is abnormal; if the power-on of the server is normal, the converting module extracts the first data in the storage module and converts the first data.

9. The server startup sequence debugging system of claim 8, wherein if the power-on of the server is abnormal, the detecting module determine whether the power-on of the server is completed.

10. The server startup sequence debugging system of claim 8, wherein if the power-on of the server is completed, the converting module extracts the first data in the storage module and converts the first data.

11. The server startup sequence debugging system of claim 8, wherein if the power-on of the server has not been completed, the detecting module continues to detect the change of the power-on signals, and the storage module continues to store the time when the second signal changes and the encoding of the second signal.

12. The server startup sequence debugging system of claim 8, wherein the transmitting device is electrically connected to the displaying device, the transmitting device comprises a universal asynchronous receiver/transmitter (UART), the UART receives the second data, and parses the second data into a third data.

13. The server startup sequence debugging system of claim 12, wherein the transmitting device further comprises a universal serial bus (USB), and the UART transmits the third data to the displaying device through the USB interface.

14. The server startup sequence debugging system of claim 12, wherein the displaying device is configured to display the power-on signals that the power-on sequence does not meet the standard during the power-on of the server.

15. The server startup sequence debugging system of claim 14, wherein the displaying device is configured to obtain the change of the power-on signals in the power-on sequence according to the third data and determine whether the power-on signals meet the standard.

16. The server startup sequence debugging system of claim 15, wherein when the change of the power-on signals meets the standard, and debugging is completed.

17. The server startup sequence debugging system of claim 16, wherein when the change of the power-on signals does not meet the standard, the displaying device displays the power-on signals that does not meet the standard.

* * * * *